(12) United States Patent
Tetzlaff

(10) Patent No.: US 7,970,090 B1
(45) Date of Patent: Jun. 28, 2011

(54) METHOD AND APPARATUS FOR A SELF-SYNCHRONIZING SYSTEM

(75) Inventor: David E. Tetzlaff, Minnetonka, MN (US)

(73) Assignee: Xilinx, Inc., San Jose, CA (US)

( * ) Notice: Subject to any disclaimer, the term of this patent is extended or adjusted under 35 U.S.C. 154(b) by 1036 days.

(21) Appl. No.: 11/405,894

(22) Filed: Apr. 18, 2006

(51) Int. Cl.
*H04L 7/02* (2006.01)
(52) U.S. Cl. ......... 375/359; 375/316; 327/157; 327/147
(58) Field of Classification Search .................. 375/359, 375/316; 327/157, 147
See application file for complete search history.

(56) References Cited

U.S. PATENT DOCUMENTS

| 4,804,954 A * | 2/1989 | Macnak et al. ............ 340/7.34 |
| 2007/0250873 A1 * | 10/2007 | Ohyama et al. ................. 725/82 |

* cited by examiner

*Primary Examiner* — David C. Payne
*Assistant Examiner* — Nader Bolourchi
(74) *Attorney, Agent, or Firm* — Michael T. Wallace; John J. King

(57) ABSTRACT

A self-synchronizing system that provides a master system component and a master clock source to provide a stable timing reference to the master system component. Timing information is then propagated throughout the system via encoded transmissions containing the timing information, or conversely, propagated by request via a training sequence. All system components other than the master system component do not require a separate clock input, since frequency coherency is maintained by internal time bases that have been calibrated to the frequency of the propagated timing information.

19 Claims, 5 Drawing Sheets

METHOD AND APPARATUS FOR A SELF-SYNCHRONIZING SYSTEM

FIELD OF THE INVENTION

The present invention generally relates to communication systems, and more particularly to self-synchronizing communication systems.

BACKGROUND

Various applications of electronic circuitry involve the use of integrated circuits (ICs). ICs, for example, facilitate the ability to incorporate a very large number of circuit elements into a very small area. ICs are particularly useful when active components, such as transistors and diodes, are needed to implement a particular design. Using today's semiconductor technology, for example, hundreds of millions and even billions of active devices may be incorporated into a single IC.

Despite the advances in today's semiconductor technology, however, device input/output (I/O) remains as a critical design issue facing electronic component designers. In particular, device I/O directly impacts the physical dimensions of electronic components, such as ICs, since each I/O connection affects the physical footprint of the IC. That is to say, for example, that each I/O connection impacts the physical dimensions of the IC in some manner, since each I/O connection requires some amount of conductive area for signal ingress/egress, as well as some amount of non-conductive area that surrounds the conductive area for signal isolation.

Thus, one aspect of reducing the physical dimensions of electronic components includes the reduction of the size of each I/O connection and its associated isolation area. The elimination of I/O connections associated with the electronic component may alternately be employed to reduce the physical dimensions of the electronic components.

Elimination of the I/O connection may simply require the elimination of the function that is provided by the particular I/O connection, thus obviating the need for the I/O connection. Conversely, I/O connection reduction may require combining one or more functions to be facilitated by a single I/O connection. In such an instance, the I/O connections associated with the combined functions may be eliminated, thus reducing the physical area that was required to accommodate the eliminated I/O connections.

Eliminating functions that are facilitated by a given I/O connection may not necessarily be the preferred method to reduce the physical and/or electrical characteristics of an electronic device. Efforts continue, therefore, to identify functions associated with I/O connections that may be combined into a single I/O connection, in order to reduce the physical dimensions of the electronic device. In addition, components associated with the combined functions may also be reduced depending upon the connections/functions being consolidated.

Consolidation of I/O connections may also be effective to reduce the number of signal routes within the IC, or conversely, to reduce the number of signal routes between ICs, such as on a printed circuit board. Such consolidation may also be effective to reduce the number of components that may be required, such as clock distribution circuits, when the I/O connection being consolidated is a clock signal connection.

SUMMARY

To overcome limitations in the prior art, and to overcome other limitations that will become apparent upon reading and understanding the present specification, various embodiments of the present invention disclose a system and method for synchronizing electronic system components without requiring a clock signal for each system component. In addition, the associated input/output (I/O) connection previously used to supply the clock signal to each system component may be removed to reduce the physical dimensions of the system component, or may conversely be utilized by another function associated with the system component.

In accordance with one embodiment of the invention, a self-synchronizing system comprises a clock source that is adapted to provide a master clock signal and a first system component that is coupled to receive the master clock signal and is adapted to provide the master clock signal to a plurality of channels. The self-synchronizing system further comprises a second system component that is coupled to the first system component via a first channel of the plurality of channels. The second system component is devoid of a dedicated clock signal input terminal. The second system component includes a first receiver that is coupled to the first channel and is adapted to extract a primary clock signal from the first channel. The primary clock signal provides synchronization information for the second system component in a first phase of operation.

In accordance with another embodiment of the invention, a method of establishing a self-synchronizing system comprises providing a first master clock signal to a first system component, generating a first slave clock signal from within the first system component in response to the first master clock signal, and distributing the first slave clock signal to a second system component via a first data channel. The second system component is optionally devoid of a clock input terminal.

In accordance with another embodiment of the invention, a self-synchronizing system component comprises a first receiver that is coupled to a first communication channel, the first receiver being adapted to extract a first synchronization signal from the first communication channel. The self-synchronizing system further comprises a second receiver that is coupled to a second communication channel, the second receiver being adapted to extract a second synchronization signal from the second communication channel. The self-synchronizing system further comprising a time base circuit that is coupled to receive one of the first and second synchronization signals and is adapted to derive a first frequency reference from the received synchronization signal. The self-synchronizing system component is optionally devoid of a dedicated clock input terminal and derives synchronization information from the first frequency reference.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
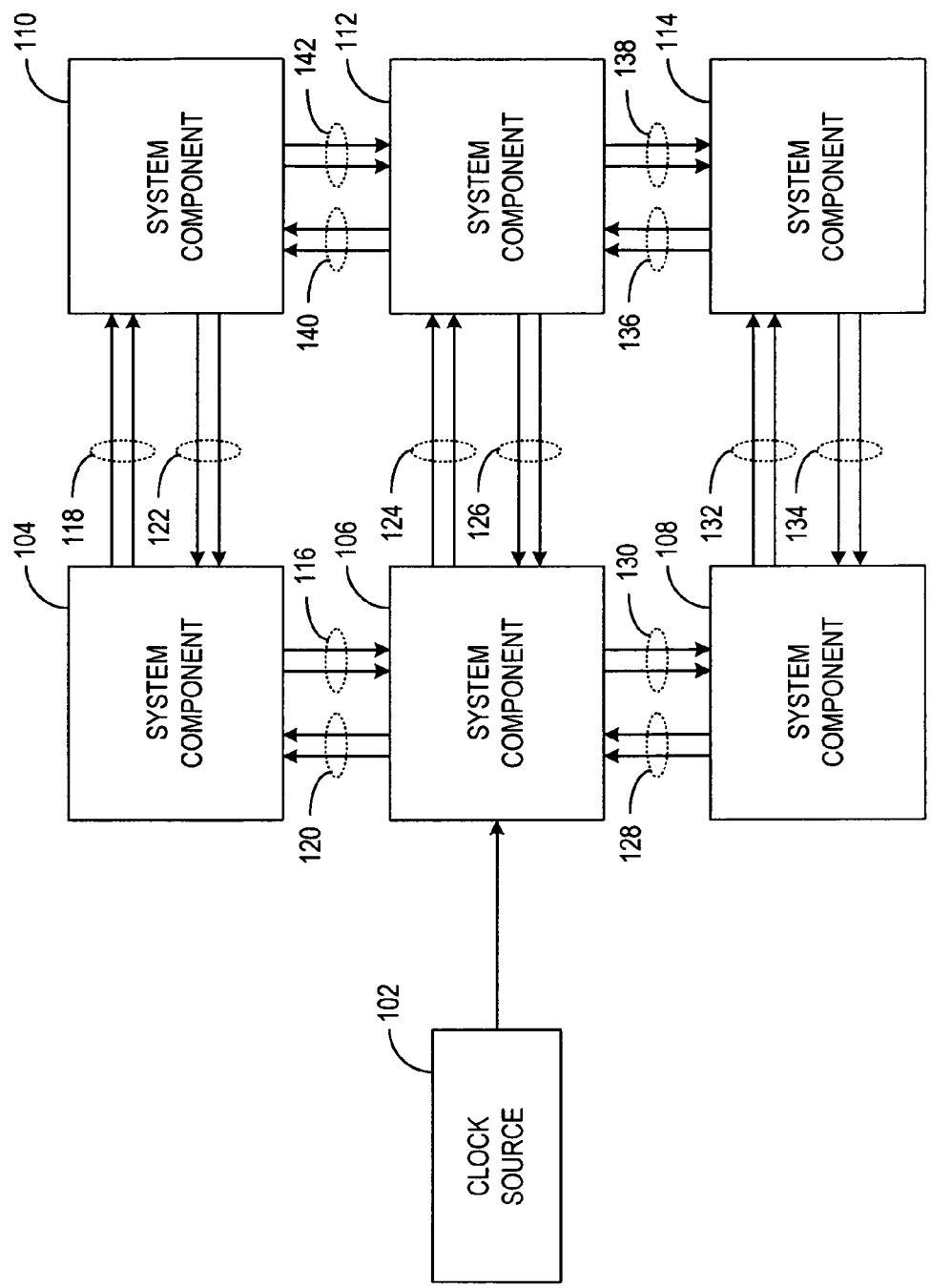
FIG. 1 illustrates an exemplary self-synchronizing system.

Generally, the various embodiments of the present invention are applied to communication systems and the self-synchronization of system components that exist within those communication systems. That is to say, that each self-synchronized system component does not necessarily require its own clock input, since synchronization information may instead be received via an input/output (I/O) connection that is utilized for a primary function and is then utilized in a secondary function to internally generate the requisite time base for that system component.

In one exemplary embodiment, synchronization information may be received by each system component via an I/O connection that is used for another function, such as an input data terminal. In such an instance, the input data terminal provides dual functionality, since in one phase of operation, synchronization information is received at the input data terminal, and in another phase of operation, operational data is received at the input data terminal. The synchronization information received by each system component may be, for example, a clock signal received at the input data terminal of each system component, thus obviating the need for a separate clock input terminal. In an alternate embodiment, synchronization information may be encoded with operational data and extracted at the receiving system component via a clock and data recovery (CDR) process.

For those system components that do not receive a separate clock input, a clock clean-up circuit, e.g., a clean-up phase locked loop (PLL), may be provided. In particular, several system components may be "daisy chained," or otherwise interconnected, in such a way that the synchronization information is propagated from one system component to another via I/O data terminals, or some other multi-function I/O connection. Such interconnectivity, however, may introduce excessive amounts of synchronization noise, e.g., phase jitter, onto the synchronization information. Allocation of a clean-up PLL, therefore, may serve to filter the accumulated phase jitter at each system component and reduce propagation of phase jitter to neighboring system components.

In an alternate embodiment, more than one I/O connection may be utilized to facilitate multiple communication paths, i.e., channels, between one system component and two or more other system components. Given that any one or more of the available channels may be used to provide the synchronization data, a second channel may be designated as a "backup," or secondary, channel. For example, in the event of a synchronization failure associated with a primary channel, a secondary channel may be allocated as a back-up to the primary channel to provide the necessary synchronization information that may be required until the primary channel is rendered operational.

The secondary channel may also be utilized in a diagnostic fashion. In particular, synchronization information provided by the primary channel may be verified through a diagnostic analysis performed via the secondary channel. In one embodiment, for example, the primary channel of a system component may be used to initially calibrate a local time base within that system component. A protocol may then be assigned, whereby proper operation, e.g., correct clock frequency, of the local time base may be verified through operation of the secondary channel and ancillary verification devices, such as frequency counters. In the event that improper operation of the primary synchronization channel is verified, a multiplexer circuit may be employed to switch the selection of the synchronization information from the primary synchronization channel to the secondary synchronization channel.

In an alternate embodiment, an initial training sequence may be transmitted from a first system component to a second system component on the primary channel. Such a training sequence may be composed of, for example, an alternating sequence of logic high and logic low data bits, to facilitate reception of the alternating sequence by the second system component. Once received, the alternating sequence may be used to calibrate a local time base to be coherent with the initial training sequence.

In a first embodiment, for example, the local time base may be a local timing reference circuit, such as a ring oscillator, whose control input may be used to increase or decrease its frequency of operation to be substantially equal to, e.g., +/−10%, of the frequency of the training sequence. Thus, the ring oscillator's frequency may be initially calibrated to the frequency of the training sequence and then later used as a frequency verification reference to verify a reasonable operating frequency of data received on the same channel that was previously used to transmit the training sequence.

In an alternate embodiment, the local time base may be implemented using a PLL, whose output frequency is made to be coherent with the frequency of the training sequence. Thus, the PLL output frequency may be calibrated to either be substantially equal to the frequency of the training sequence, or to be substantially equal to an integer multiple of the frequency of the training sequence, in order to match a frequency of operation that is required by the channel during normal operation. Once trained, the PLL may continue to derive reference information from the input data stream via, for example, a CDR system that is used to extract encoded timing information from the primary channel.

A CDR system may be further implemented to update the frequency of the internal timing reference, since the internal timing reference may tend to drift with supply voltage and temperature variation. Alternately, the calibrated timing reference may continue to be used, instead of the CDR system, for the verification of the correct data rate. As described in more detail below, a signalling protocol may be used to recalibrate the timing reference on a predetermined schedule.

The signalling protocol may also be used by the second system component, whereby the second system component requests the transmission of the training sequence from the first system component. In a full duplex system, for example, a reverse channel from the second system component to the first system component may be used to request the training sequence. Alternately, the training sequence may be requested through the use of a substantially static channel. In such an instance, a substantially static signal, or a signal utilizing a relatively low bandwidth, may be used to signal the request for a training sequence transmission. Further, since the timing signal request is substantially static, it does not require an accurate timing reference either for transmission or for reception.

Turning to FIG. 1, an exemplary embodiment of a self-synchronizing system is illustrated. As can be seen, the only system component receiving a separate clock signal is system component 106, which receives an external, or out-of-band, clock signal from clock source 102. Communication between system component 106 and neighboring system components 104 and 108-114 occurs via channels 116-134. Channels 116-134 may be characterized as differential serial I/O signals, but are not necessarily differential nor are they necessarily serial. During communications, a clock signal may be extracted from the transmission, thus obviating the need for a separate clock input connection for system components 104, and 108-114.

In operation, system component 106 receives a stable timing reference signal from clock source 102. The timing reference signal may then be used to synchronize a local time base, e.g., a PLL or calibrated ring oscillator, within system component 106. Once synchronized, synchronization data from system component 106 may then be transmitted to one or more of system components 104, 112, and/or 108 at a frequency that is coherent with the timing reference signal received from clock source 102.

In a first embodiment, system component 106 may transmit synchronization data to system components 104, 112, and/or 108 in the form of a training sequence. In such an instance, the training sequence may be transmitted coherently with the frequency of clock source 102, at a frequency that is an integer multiple or dividend of the frequency of the timing reference transmitted by clock source 102. The training sequence may be any combination of data bits that may be easily received by system components 104, 112, and/or 108, such as a data sequence consisting of alternating logic high and logic low values.

As discussed above, transmission of the training sequence may be requested by system components 104, 112, and/or 108 via a synchronization protocol. In such an instance, system components 104, 112, and/or 108 may utilize reverse channels 116, 126, and/or 128, respectively, to request the predetermined training sequence, so that time base circuitry within system components 104, 112, and/or 108 (not shown) may be initially calibrated to the phase/frequency of the training sequence. The synchronization protocol may then be repeated at specific intervals, as determined by the synchronization protocol, to compensate for drift that may be due to supply voltage and/or temperature variations.

Figure 2:
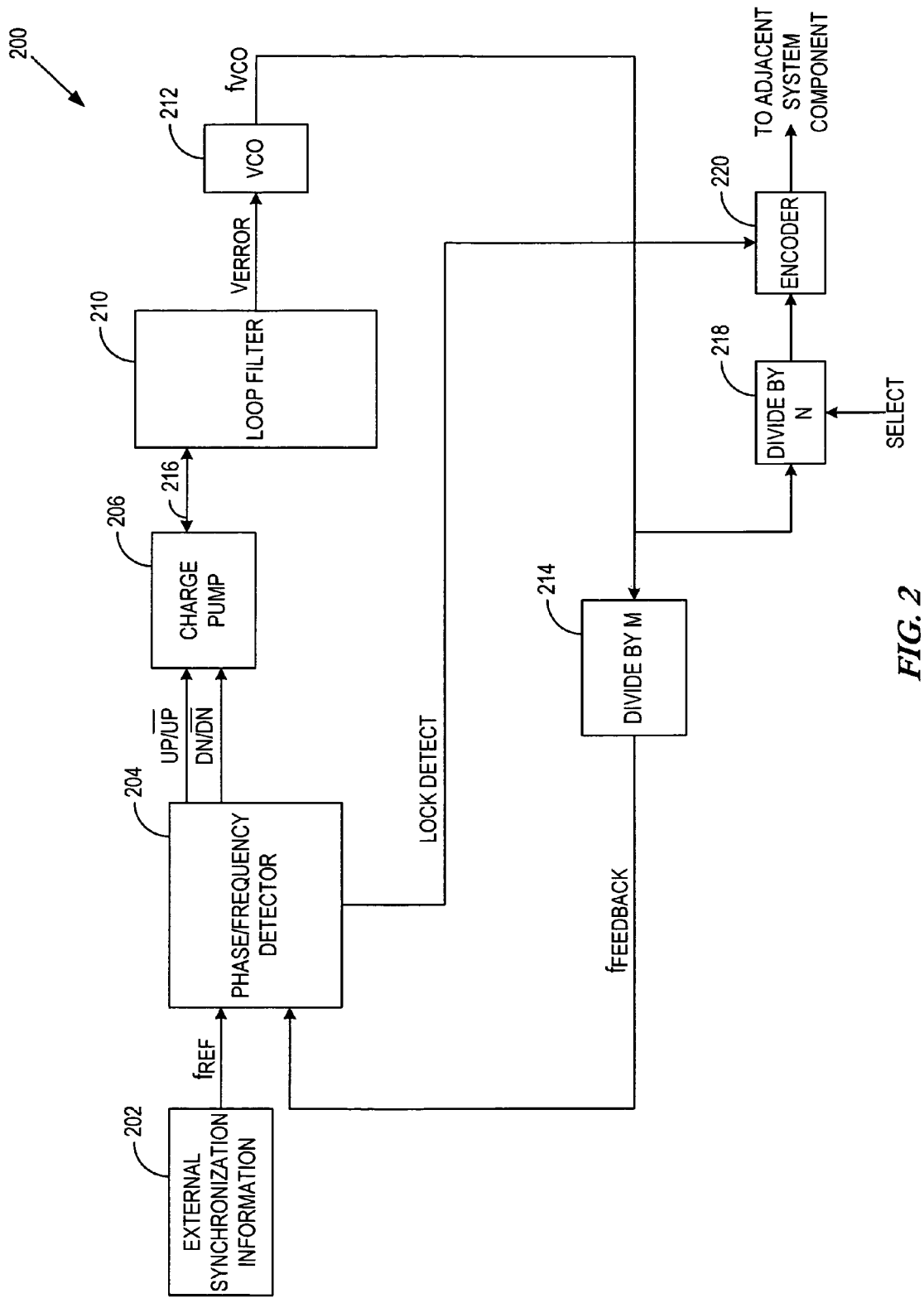
FIG. 2 illustrates an exemplary clean-up phase locked loop (PLL)

It can be seen that system components 104 and 108 are responsible for relaying synchronization information that is received from system component 106 to system components 110 and 114, respectively. Alternately, system components 110 and/or 114 may receive synchronization information from system component 112 via channels 140 and/or 138, respectively. In order to insure that the relayed synchronization information is substantially free from phase jitter, or any other phase related errors, clean-up PLL 200 of FIG. 2, for example, may be employed within system components 104, 108, and 112 to filter the synchronization information prior to transmission to system components 110 and 114.

PLL 200 exemplifies a charge-pump based PLL (CPLL), which is an attractive PLL design implementation that facilitates flexible design tradeoffs by decoupling various design parameters, such as loop bandwidth, damping factor, and lock range. CPLL 200 consists of, for example, phase/frequency detector 204, charge pump 206, loop filter 210, voltage controlled oscillator (VCO) 212, and optional divider 214 that may be used in PLL applications requiring clock multiplication. External synchronization information 202 may be received from a system component that is relaying the synchronization information, such as system component 106 via channels 120 or 130, as illustrated in FIG. 1. Conversely, the external synchronization information may represent the clock signal as received by system component 106 from clock source 102.

Clock multiplication may be necessary, when the output frequency of VCO 212 is operative in a higher frequency range, such as 5 gigahertz (GHz), but external synchronization information 202 is operating at a much lower frequency, such as 78.125 megahertz (Mhz). In such an instance, a clock multiplication of 64 is implemented through the use of feedback division, such that the 78.125 Mhz reference signal, $f_{REF}$, supplied by external synchronization information 202 may be compared in both phase and frequency to the 5 GHz output of VCO 212. As such, the feedback frequency, $f_{FEEDBACK}$, may be generated in accordance with equation (1):

$$f_{FEEDBACK} = f_{VCO}/M, \qquad (1)$$

where $f_{VCO}$ is the output frequency of VCO 212 and M is the integer divisor provided by divider 214. In this instance, M may be set to 64, since 5 GHz/64=78.125 Mhz, which is equal to the reference frequency, $f_{REF}$.

In operation, phase/frequency detector 204 supplies digital signals, e.g., UP and DN, and complementary signals, e.g., $\overline{UP}$ and $\overline{DN}$, which corresponds to the phase/frequency error between $f_{REF}$ and $f_{FEEDBACK}$. For example, if the phase/frequency of the output of divider 214 is lagging signal $f_{REF}$, then the pulse width of signal UP may increase and the pulse width of signal DN may decrease to cause the phase/frequency of VCO 212 to be advanced in phase/frequency. Conversely, if the phase/frequency of the output of divider 214 is advanced with respect to signal $f_{REF}$, then the pulse width of signal UP may decrease and the pulse width of signal DN may increase to cause the phase/frequency of VCO 212 to be retarded in phase/frequency.

Charge pump 206 reacts to the phase/frequency error signals by generating current signal 216, $I_{216}$, in response to the phase/frequency error signals. For example, if the pulse width of signal UP is increased, the magnitude of current signal $I_{216}$ may also increase. Conversely, if the pulse width of signal DN is increased, then the magnitude of current signal $I_{216}$ may also decrease. Alternatively, the pulse width of a fixed magnitude current signal may be modulated in response to the UP and DN signals to effect an average increase, or decrease, in current signal $I_{216}$.

Current signal $I_{216}$ is then converted into an error voltage, $V_{ERROR}$, by loop filter 210, which is then supplied to VCO 212 to set the output frequency, $f_{VCO}$, of VCO 212. Through negative feedback, the phase/frequency error between $f_{REF}$ and $f_{FEEDBACK}$ is forced to be substantially zero through operation of CPLL 200. By changing the value of the divisor, M, the output frequency, $f_{VCO}$, may be programmed to operate over a frequency range of one or more frequency decades as required by the particular application, while maintaining frequency/phase coherency with reference frequency, $f_{REF}$.

Once CPLL 200 has acquired phase coherency with reference frequency, $f_{REF}$, signal LOCK DETECT is asserted. Signal LOCK DETECT may be received by encoder 220 to indicate that synchronization information received from CPLL 200 is valid and may be encoded by encoder 220 prior to transmission to adjacent system components. Any number of encoding formats may be implemented by encoder 220, such as 8B/10B, 64B/66B, Manchester, etc. A programmable clock frequency may also be received by encoder 220, so that a programmable frequency clock signal may be encoded by encoder 220. In particular, divider 218 may receive reference signal, $f_{VCO}$, as a frequency reference signal and may be provided as a programmable frequency clock signal having frequency, $f_{VCO}/N$, where the integer divisor, N, is programmed via signal SELECT. As such, the encoded clock signal provided by encoder 220 may represent an integer dividend of signal $f_{VCO}$.

System components 104 and/or 108, for example, may incorporate CPLL 200 to provide valid synchronization information to adjacent system components, e.g., 110 and/or 114, respectively. In particular, external synchronization information 202 may be received by system components 104 and/or 108 from system component 106 via channels 120 or 130, respectively. CPLL 200 may then be used to establish phase/frequency coherency between signal $f_{REF}$ and signals $f_{VCO}$ and $f_{FEEDBACK}$, as discussed above, whereby signal LOCK DETECT is asserted once phase/frequency coherency is established.

Once phase/frequency coherency is established, encoder 220 encodes a programmable frequency reference signal, e.g., $f_{VCO}/N$, as selected by divider 218. The encoded signal may then be transmitted to adjacent system components via existing data channels so that the individual timing references within each system component may be calibrated without the need for external clock terminals. It should be noted, that the signal transmitted by encoder 220 may be an uncoded training sequence of alternating logic high and logic low values, or conversely, may be an encoded signal using any number of coding formats as discussed above. In any case, the signal provided by encoder 220 may be deemed to be a slave clock signal that is coherent with a master clock signal as provided by clock source 102.

Figure 3:
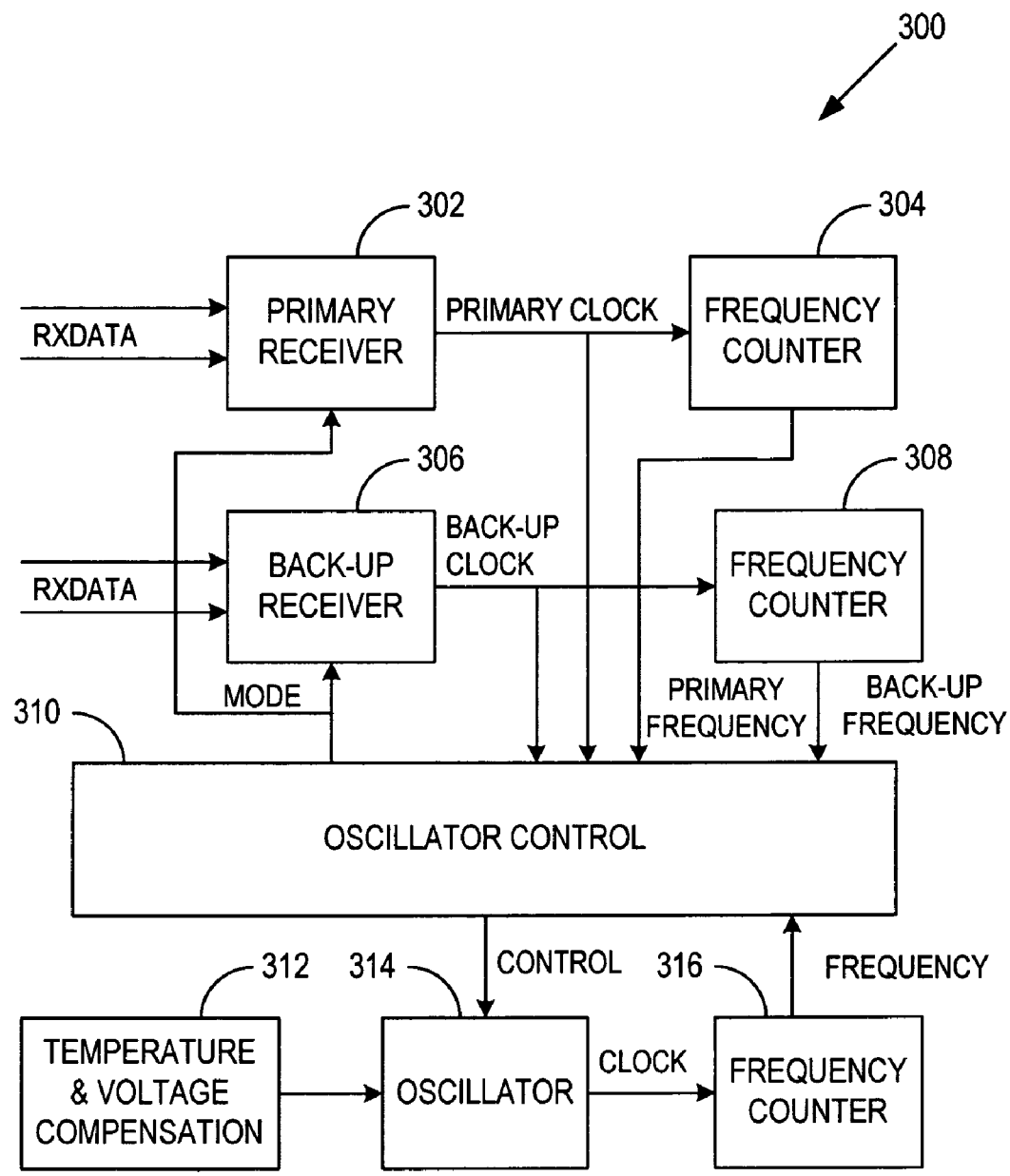
FIG. 3 illustrates an exemplary timing reference and calibration circuit.

Turning to FIG. 3, exemplary timing reference and calibration circuit 300 is exemplified, whereby calibration of an internal time base may be facilitated. As discussed above, an internal time base, e.g., oscillator 314, may be implemented through the use of a ring oscillator, or conversely, as a voltage/current controlled oscillator. In any event, the oscillation frequency of oscillator 314 may be controlled by oscillator control 310 via signal CONTROL.

As discussed above, oscillator calibration data may be received via either of primary receiver 302 or back-up receiver 306 in the form of a training sequence. With reference to FIG. 1, for example, primary receiver 302 may correspond to the receiver associated with channel 118 of system component 110, while back-up receiver 306 may correspond to the receiver associated with channel 140 of system component 110, or vice versa. In such an instance, the training sequence may be received by primary receiver 302, back-up receiver 306, or both depending upon the value of signal MODE.

As discussed above, a synchronization protocol may be used to determine whether the training sequence is requested from, or whether the training sequence is automatically transmitted to, timing reference and calibration circuit 300. In either instance, the training sequence may be generated, for example, by encoder 220 of FIG. 2 and then received and converted to signal PRIMARY CLOCK by primary receiver 302. The training sequence may also be received and converted to signal BACK-UP CLOCK by back-up receiver 306.

Frequency counter 304 receives signal PRIMARY CLOCK from primary receiver 302 and provides signal PRIMARY FREQUENCY, which indicates the frequency of signal PRIMARY CLOCK to oscillator control 310. Similarly, frequency counter 308 receives signal BACK-UP CLOCK from back-up receiver 306 and provides signal BACK-UP FREQUENCY, which indicates the frequency of signal BACK-UP CLOCK to oscillator control 310.

In operation, oscillator 314 may be calibrated to be substantially equal to the frequency of either signal PRIMARY CLOCK or BACK-UP CLOCK. Assuming that calibration is facilitated through the use of signal PRIMARY CLOCK, oscillator control 310 varies the level of signal CONTROL, to assign the frequency of signal CLOCK from oscillator 314, as determined by frequency counter 316, to be substantially equal to signal PRIMARY FREQUENCY.

Thus, oscillator control 310 compares the values of PRIMARY FREQUENCY and FREQUENCY to determine a frequency difference between the two signals. Signal CONTROL may then be adjusted by oscillator control 310 upwards or downwards to effect the necessary frequency adjustment of signal CLOCK. If a voltage controlled oscillator is used, for example, then a voltage signal is provided as signal CONTROL to make the required frequency adjustments to signal CLOCK. Alternately, signal CONTROL may represent a voltage supply input to a ring oscillator, in which case the gate delay of each stage of the ring oscillator is adjusted to generate the required frequency output. Conversely, delay stages may be activated/deactivated within the ring oscillator in response to signal CONTROL to effect a change in frequency output of the ring oscillator.

Once the frequency of signal CLOCK is adjusted to be substantially equal to the frequency of either of signals PRIMARY FREQUENCY or BACK-UP FREQUENCY, then signal CLOCK from oscillator 314 may be used as the internal time base for system components 104 and 108-114. Due to temperature and/or power supply variation, however, temperature and voltage compensation block 312 may be used to generate the necessary phase/frequency control adjustments to offset such variations.

In an alternate mode of operation, the frequency of signal clock may be used to qualify the frequency of a recovered clock, e.g., PRIMARY CLOCK or BACK-UP CLOCK, as recovered by a clock and data recovery (CDR) circuit (not shown) from either of primary receiver 302 or back-up receiver 306. In such an instance, either signal PRIMARY FREQUENCY or signal BACK-UP FREQUENCY may be routed to oscillator control 310 for comparison with signal FREQUENCY.

Given that signal PRIMARY FREQUENCY is sought to be qualified, for example, then a mismatch between signals PRIMARY FREQUENCY and FREQUENCY may indicate that the primary data channel, as received by primary receiver 302, is defective. Thus, the error condition may be reported as part of a diagnostic protocol via signal MODE by oscillator control 310, whereby the back-up data channel, as received by back-up receiver 306, may take up operations while the primary data channel is repaired. Thus, signal MODE may indicate which of receivers 302 and/or 306 is providing clock and data recovery operations and which of receivers 302 and/or 306 is in a stand-by mode.

Figure 4:
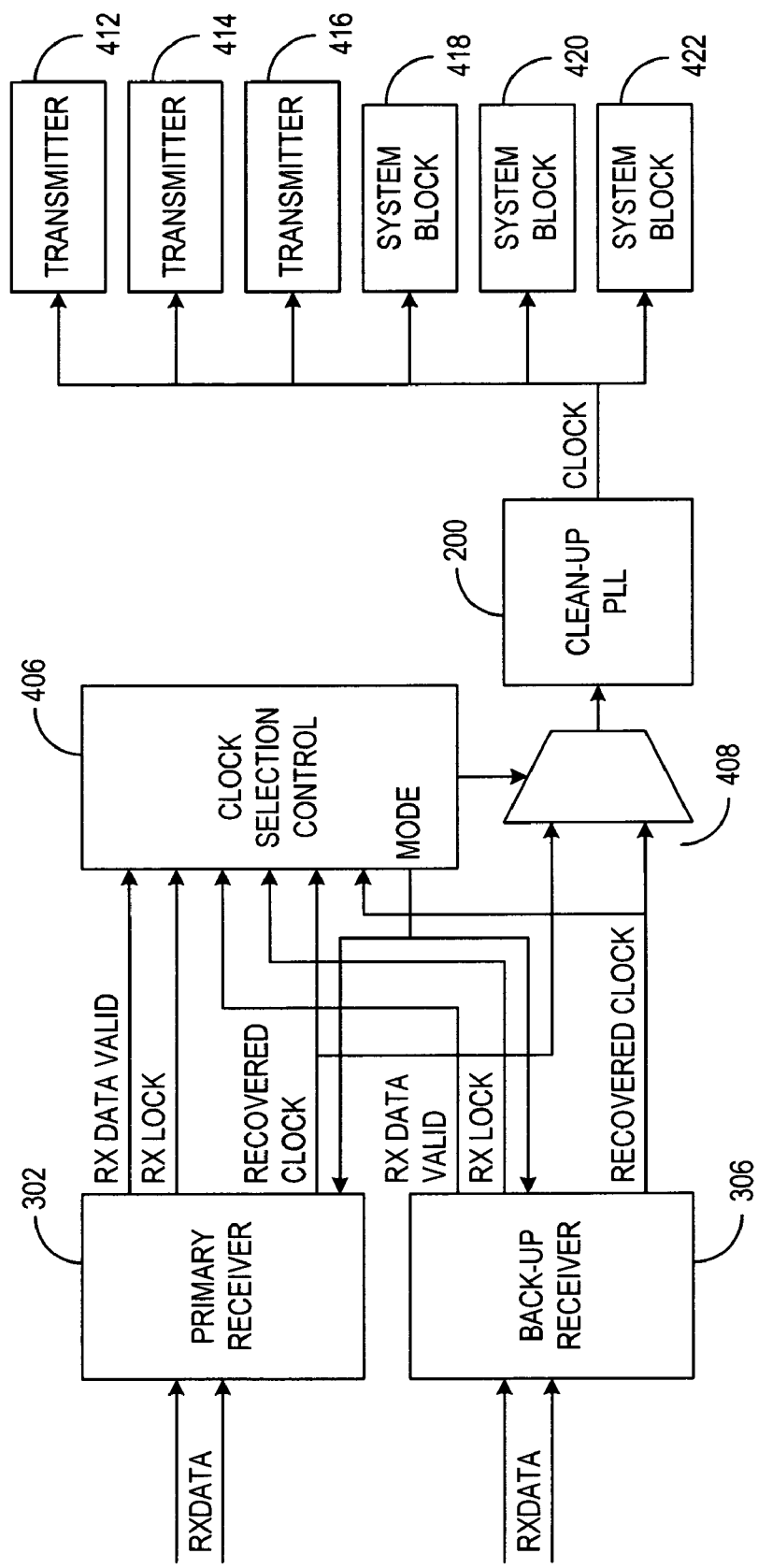
FIG. 4 illustrates an exemplary clock multiplexing circuit.

Turning to FIG. 4, an exemplary clock multiplexing circuit is illustrated, whereby the recovered clock signal from either of primary receiver 302 or back-up receiver 306 is selected as the timing reference to be utilized for the main operations of the associated system component. In particular, the clock multiplexing circuit of FIG. 4 may exist in any one of system components 104 and 108-114 and may operate to select which channel of channel pairs 120/122, 130/134, 118/140, 124/142/136, and/or 138/132, respectively, are to be selected for CDR operations.

As discussed above, primary receiver 302 and back-up receiver 306 receive signal MODE from oscillator control 310 of FIG. 3, which in one embodiment, is implemented within clock and selection control 406. Signals RX DATA VALID and RX LOCK may accordingly be set to indicate to clock selection control 406, which of the RECOVERED CLOCK signals transmitted by primary receiver 302 and back-up receiver 306 to select. For example, if oscillator control 310 determines that primary receiver 302 is defective, then the corresponding control signals RX DATA VALID and RX LOCK from primary receiver 302 may be deasserted (in response to signal MODE) to allow clock selection control 406 to select signal RECOVERED CLOCK from back-up receiver 306 by appropriate assertion of the select signal to multiplexer 408.

If, on the other hand, oscillator control 310 determines that back-up receiver 306 is defective, then the corresponding control signals RX DATA VALID and RX LOCK from back-up receiver 306 may be deasserted (in response to signal MODE) to allow clock selection control 406 to select signal RECOVERED CLOCK from primary receiver 302 by appropriate assertion of the select signal to multiplexer 408. Once selected, signal RECOVERED CLOCK is submitted to clean-up PLL 200, so that phase jitter and other phase related noise may be substantially removed, as discussed above in relation to FIG. 2, prior to delivery to transmitters 412-416 and system blocks 418-422.

Figure 5:
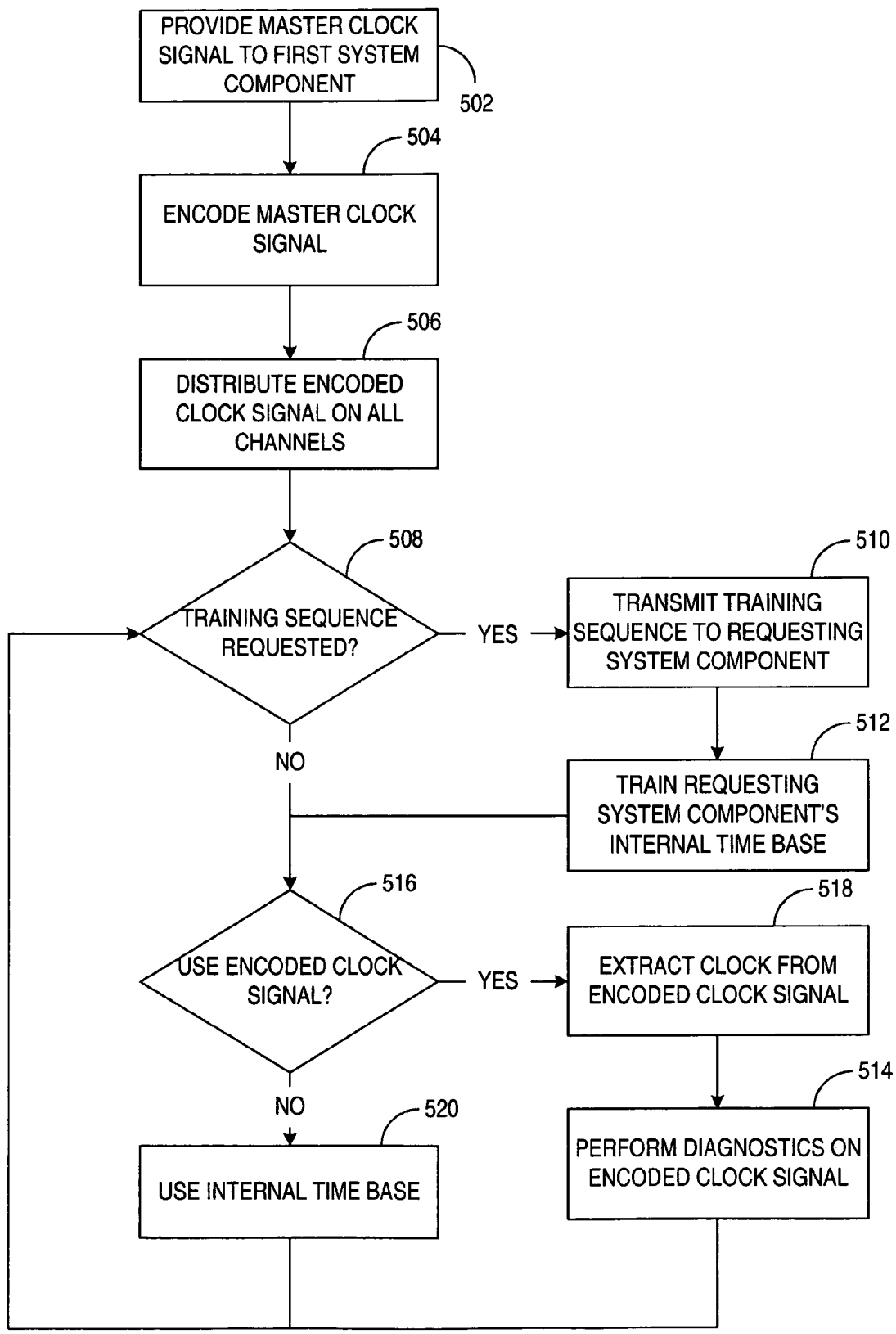
FIG. 5 illustrates an exemplary method of establishing a self-synchronizing system.

Turning to FIG. 5, a flow diagram illustrates an exemplary method of providing a self-synchronizing system. In step 502, a master clock signal is provided to a single system component, as exemplified in FIG. 1, whereby clock source 102 provides a stable clock signal to system component 106. System component 106 may then phase lock an internal PLL to the received clock input. System component 106 may then generate a programmable frequency synchronization signal from the PLL, which is frequency coherent with the clock signal.

In step 504, system component 106 encodes the frequency synchronization signal in accordance with any number encoding algorithms, including 8B/10B, 64B/66B, Manchester, etc. The encoded clock signal may then be distributed in step 506 to all other system components via primary and back-up communication channels. Each recipient system component may then perform synchronization information and data extraction via a CDR process performed on the primary and/or back-up communication channels. The extracted synchronization information may then be used to train internally operating time base circuitry as discussed above in relation to FIG. 3.

In step 508, a training sequence may be requested by any system component within the communication system. Conversely, a synchronization protocol may be employed, whereby the training sequence is automatically transmitted to predetermined system components for calibration or other diagnostic reasons. In either case, the training sequence may be transmitted to one or more system components as in step 510.

For example, system component 110 of FIG. 1 may request a training sequence to be transmitted from system component 104 via channel 118. The training sequence may represent an easily received data sequence of alternating logic high and logic low values. Frequency counters may then be employed to establish a frequency of the received training sequence, which is both frequency and phase coherent with the master clock source, as provided by clock source 102, for example.

Once received, system component 110 may synchronize its internal time base, e.g., oscillator 314, to the received training signal as discussed above in relation to FIG. 3 as in step 512. Synchronization of the internal time base may be required to initially set the operating frequency of oscillator 314. Conversely, synchronization of the internal time base may be required at predetermined intervals, as may be determined by a synchronization protocol, whereby the internal time base is recalibrated due to power supply or temperature induced drift.

In step 516, either the distributed encoded clock signal may be used as the time reference for each system component, or the internal time base may be used as the time reference. If the internal time base is selected, then step 520 selects the internal time base to provide the time reference for the system component. If the encoded clock signal is selected, on the other hand, then a CDR process is used to extract the encoded clock signal from the received encoded clock signal, which is then used as the time reference for the system component.

In step 514, the system component may then perform diagnostics on the encoded clock signal as received on its primary or back-up channels. In particular, the frequency of the recovered clock signal on the primary channel and/or the back-up channel may be compared to the system component's internal time base. If the frequency error exceeds a predetermined threshold, either the primary channel or the back-up channel may be taken off-line and reported as defective. In such an instance, the channel that passes the diagnostic test is designated as the operational channel and its recovered clock signal is selected for operation as discussed above in relation to FIG. 4.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A self-synchronizing system, comprising:
a clock source adapted to provide a master clock signal;
a first system component coupled to receive the master clock signal at a first clock input and adapted to provide the master clock signal to a plurality of channels; and
a second system component coupled to the first system component via a first channel of the plurality of channels, the second system component being adapted to operate in a first phase of operation while receiving synchronization information and in a second phase of operation while receiving operational data, wherein the second system component does not have a dedicated clock signal input terminal coupled to receive the master clock signal, the second system component including a first receiver coupled to the first channel and adapted to extract a primary clock signal from data bits transmitted from the first system component to the second system component on the first channel, wherein the primary clock signal provides the synchronization information for the second system component in the first phase of operation comprising a synchronization phase and has a frequency corresponding to a frequency of the data bits transmitted from the first system component to the second system component on the first channel.

2. The self-synchronizing system of claim 1, wherein the second system component further includes a second receiver coupled to a second channel of the plurality of channels and adapted to extract a secondary clock signal from the second channel.

3. The self-synchronizing system of claim 2, wherein the second system component further includes a clock selection circuit coupled to the first and second receivers and adapted to select the primary clock signal in the first phase of operation and the secondary clock signal in a second phase of operation.

4. The self-synchronizing system of claim 3, wherein the clock selection circuit comprises:
a first frequency counter coupled to the first receiver and adapted to provide a first count signal indicative of a frequency of the primary clock signal; and
a second frequency counter coupled to the second receiver and adapted to provide a second count signal indicative of a frequency of the secondary clock signal.

5. The self-synchronizing system of claim 4, wherein the clock selection circuit further comprises a multiplexer coupled to the first and second receivers and adapted to select the primary clock signal in the first phase of operation and adapted to select the secondary clock signal in the second phase of operation.

6. The self-synchronizing system of claim 5, wherein the second system component further includes a phase locked loop (PLL) coupled to receive the selected clock signal from the multiplexer and adapted to provide a slave clock signal that is generated from the selected clock signal of the primary clock signal and the secondary clock signal.

7. The self-synchronizing system of claim 6, further comprising a third system component coupled to the second system component, wherein the third system component is devoid of a clock signal input terminal and includes a third receiver coupled to receive the slave clock signal from data bits transmitted from the second system component to the third system component and adapted to extract synchronization information from the slave clock signal.

8. The self-synchronizing system of claim 4, wherein the clock selection circuit further comprises a local time base, wherein an output frequency of the local time base is adjusted to be substantially equal to the first count signal in the first phase of operation and substantially equal to the second count signal in the second phase of operation.

9. The self-synchronizing system of claim 8, wherein the local time base comprises a ring oscillator.

10. The self-synchronizing system of claim 8, wherein the local time base comprises a phase locked loop (PLL).

11. The self-synchronizing system of claim 8, wherein the clock selection circuit further comprises a third frequency counter coupled to the local time base and adapted to provide a third count signal indicative of a frequency of the output frequency of the local time base.

12. A method of establishing a self-synchronizing system, comprising:
providing a first master clock signal to a clock input terminal of a first system component;
generating a first slave clock signal from within the first system component based upon the first master clock signal; and
distributing the first slave clock signal to a second system component via data bits transmitted from the first system component to the second system component on a first data channel, wherein the second system component does not have a dedicated clock signal input terminal coupled to receive the first master clock signal and extracts a primary clock signal from the data bits transmitted from the first system component to the second system component on the first channel, the primary clock signal having a frequency corresponding to a frequency of the data bits transmitted from the first system component to the second system component on the first channel;
wherein the second system component is adapted to operate in a first phase of operation while receiving synchronization information and in a second phase of operation while receiving operational data.

13. The method of claim 12, wherein distributing the first slave clock signal comprises:
encoding the first slave clock signal; and
transmitting the encoded first slave clock signal to the second system component.

14. The method of claim 13, further comprising:
receiving an encoded second slave clock signal at the second system component from a third system component;
selecting between the encoded first and second slave clock signals; and
deriving synchronization information used by the second system component from the selected encoded slave clock signal.

15. The method of claim 12, wherein distributing the first slave clock signal comprises:
transmitting the first slave clock signal as a training sequence to the second system component;
programming a frequency of a local frequency reference of the second system component to be substantially equal to a frequency of the first slave clock signal; and
deriving synchronization information used by the second system component from the local frequency reference.

16. A self-synchronizing system component, in a system of plurality of system components, the self-synchronizing system component comprising:
a first receiver coupled to a first communication channel, the first receiver being adapted to extract a first recovered clock signal from data on the first communication channel received at an input of the first receiver;
a second receiver coupled to a second communication channel, the second receiver being adapted to extract a second recovered clock from data on the second communication channel received at an input of the second receiver, wherein the second receiver does not have a dedicated clock signal input terminal coupled to receive the master clock signal, and wherein a first phase of operation comprises a synchronization phase and has a frequency corresponding to a frequency of data bits transmitted to the first receiver on the first communication channel or to the second receiver on the second communication channel;
a multiplexer coupled to the first and second receivers and adapted to select one of the first recovered clock signal or the second recovered clock signal at an output of the multiplexer in response to a select signal; and
a time base circuit coupled to receive the selected recovered clock signal and adapted to derive a first reference clock from the selected recovered clock signal, wherein the self-synchronizing system component derives the first reference clock from the data on the first communication channel received at the input of the first receiver or from the data on the second communication channel received at the input of the second receiver.

17. The self-synchronizing system component of claim 16, further comprising a phase locked loop coupled to receive the first reference clock and adapted to generate a second reference clock in phase coherence with the first reference clock.

18. The self-synchronizing system component of claim 16, further comprising:
a first frequency counter coupled to receive the first recovered clock signal and adapted to provide a first count signal indicative of a frequency of the first signal recovered clock signal; and a second frequency counter coupled to receive the second synchronization signal recovered clock signal and adapted to provide a second count signal indicative of a frequency of the second recovered clock signal.

19. The self-synchronizing system component of claim 18, further comprising an oscillator control block coupled to receive the first and second count signals and adapted to provide a frequency control signal to the time base circuit to adjust the frequency of the time base circuit to be substantially equal to one of the first and second count signals.

* * * * *